US011229009B2

(12) United States Patent
Charbit et al.

(10) Patent No.: US 11,229,009 B2
(45) Date of Patent: Jan. 18, 2022

(54) NARROWBAND REFERENCE SIGNAL TRANSMISSION ON NON-ANCHOR CARRIERS IN NB-IOT

(71) Applicant: MediaTek Inc., Hsinchu (TW)

(72) Inventors: Gilles Charbit, Hampshire (GB); Li-Chuan Tseng, Hsinchu (TW); Shiang-Jiun Lin, Hsinchu (TW); Per Johan Mikael Johansson, Kungsangen (SE)

(73) Assignee: MediaTek Inc.

( * ) Notice: Subject to any disclaimer, the term of this patent is extended or adjusted under 35 U.S.C. 154(b) by 0 days.

(21) Appl. No.: 16/535,046

(22) Filed: Aug. 7, 2019

(65) Prior Publication Data

US 2020/0053695 A1 Feb. 13, 2020

Related U.S. Application Data

(60) Provisional application No. 62/717,154, filed on Aug. 10, 2018.

(51) Int. Cl.
*H04W 76/28* (2018.01)
*H04W 68/10* (2009.01)
*H04W 84/02* (2009.01)
*H04W 76/27* (2018.01)
*H04W 8/18* (2009.01)

(52) U.S. Cl.
CPC ............. *H04W 68/10* (2013.01); *H04W 8/18* (2013.01); *H04W 76/27* (2018.02); *H04W 76/28* (2018.02); *H04W 84/022* (2013.01)

(58) Field of Classification Search
CPC . H04W 68/10; H04W 52/0209; H04W 76/28; H04W 8/18; H04W 52/02; H04B 7/0695
See application file for complete search history.

(56) References Cited

U.S. PATENT DOCUMENTS

2008/0182596 A1* 7/2008 Wang .................... H04W 76/28
                                                                   455/458
2013/0095818 A1* 4/2013 Levy ..................... H04L 7/0083
                                                                   455/423

(Continued)

FOREIGN PATENT DOCUMENTS

WO    WO 2017145120 A1    8/2017
WO    WO 2018128579 A1    7/2018

OTHER PUBLICATIONS

China National Intellectual Property Administration, International Search Report and Written Opinion for PCT/CN2019/099888, dated Oct. 30, 2019.

(Continued)

*Primary Examiner* — Myron Wyche
(74) *Attorney, Agent, or Firm* — Han IP IPLLC; Andy M. Han (57) ABSTRACT

Various examples and schemes pertaining to narrowband reference signal (NRS) transmission on non-anchor carriers in narrowband IoT (NB-IoT) are described. A wireless network indicates a subset of one or more paging groups of user equipment (UEs) among a plurality of UEs in an NB-IoT cell. The wireless network then transmits one or more narrowband reference signals (NRSs) in one or more paging frames or one or more paging occasions associated with the subset of one or more paging groups.

11 Claims, 6 Drawing Sheets

(56) References Cited

U.S. PATENT DOCUMENTS

| | | |
|---|---|---|
| 2018/0019839 A1* | 1/2018 | Chen ..................... H04L 1/0045 |
| 2018/0124644 A1* | 5/2018 | Rico Alvarino .. H04W 72/0473 |
| 2018/0124687 A1* | 5/2018 | Park ..................... H04L 5/1469 |
| 2018/0199309 A1 | 7/2018 | Islam et al. |
| 2018/0227900 A1* | 8/2018 | Akkarakaran ....... H04B 7/0695 |
| 2019/0349985 A1* | 11/2019 | Lin ....................... H04L 5/0053 |

OTHER PUBLICATIONS

Ericsson, NRS transmission on non-anchor carriers, 3GPP TSG RAN #88, R1-1701894, Athens, Greece, Feb. 13-17, 2017.
Taiwan Intellectual Property Office, Office Action for Taiwan Patent Application No. 108128313, dated Jan. 29, 2021.

\* cited by examiner

NARROWBAND REFERENCE SIGNAL TRANSMISSION ON NON-ANCHOR CARRIERS IN NB-IOT

CROSS REFERENCE TO RELATED PATENT APPLICATION(S)

The present disclosure is part of a non-provisional application claiming the priority benefit of U.S. Patent Application No. 62/717,154, filed on 10 Aug. 2018, the content of which being incorporated by reference in its entirety.

TECHNICAL FIELD

The present disclosure is generally related to Internet of Things (IoT) and, more particularly, to narrowband reference signal (NRS) transmission on non-anchor carriers in narrowband IoT (NB-IoT).

BACKGROUND

Unless otherwise indicated herein, approaches described in this section are not prior art to the claims listed below and are not admitted as prior art by inclusion in this section.

Communications in NB-IoT can operate in multi-carrier mode. That is, a specific carrier, herein referred to as an anchor carrier or anchor NB-IoT carrier, may be configured for initial connection setup and data transfer while other carriers, herein referred to as non-anchor carriers or non-anchor NB-IoT carriers, may be configured only for data communication. On a non-anchor NB-IoT carrier, NRS transmission is only sent by a base station (e.g., eNB) when data or signaling is sent, thereby minimizing NRS interference on other cells. A user equipment (UE) may use an anchor carrier with essential control-plane radio resource common as well as user-plane data signaling and non-anchor carrier for additional user-plan data capacity.

Under current 3$^{rd}$-Generation Partnership Project (3GPP) NB-IoT specifications, it is not possible to reliably measure the link quality of a non-anchor carrier by making NRS-based measurements. In a worst-case scenario, there would be no signaling or data transmitted on such a carrier and, consequently, no NRS would be transmitted. In other cases, transmission of NRS would be done sporadically when data or signaling occurs on the non-anchor carrier. However, this makes link quality measurements impractical.

Figure 6:
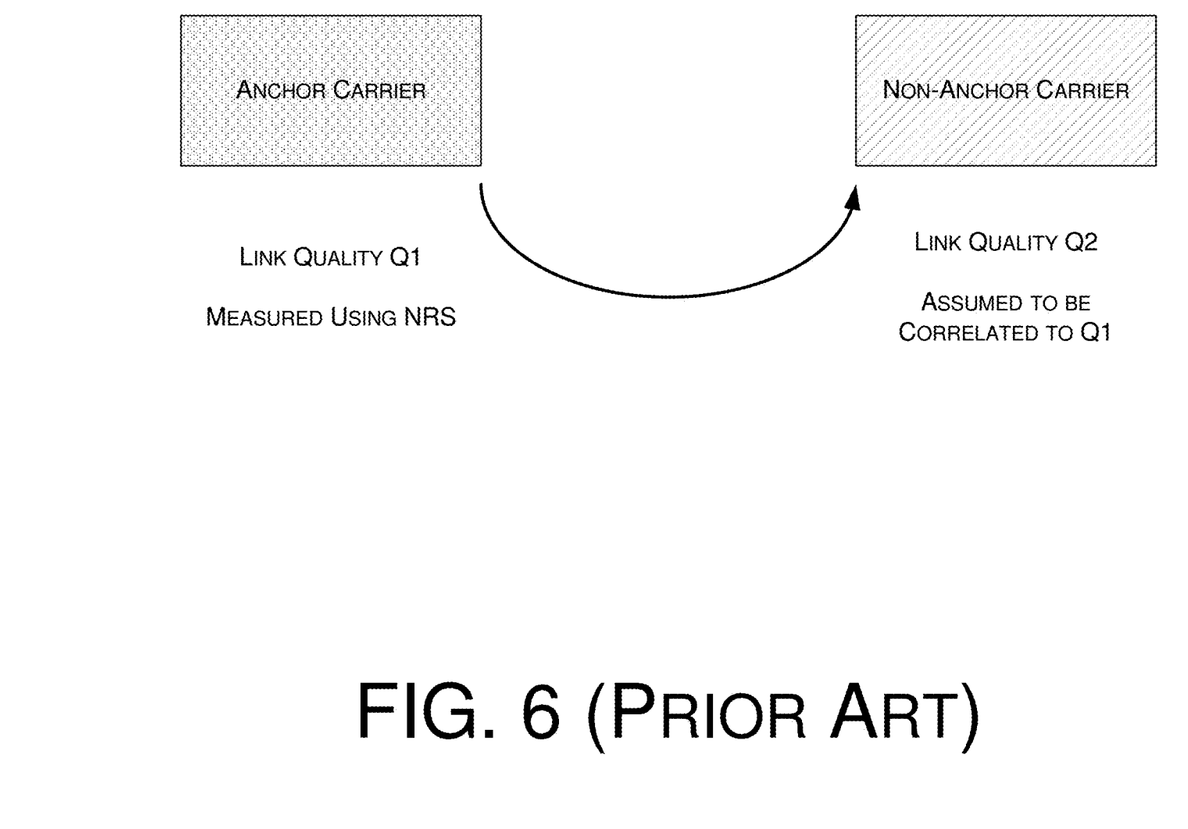
FIG. 6 is a diagram of link quality measurements.

In the specifications, NRS-based measurements are made on an anchor carrier. The UE may assume that the link quality of the anchor carrier correlates reasonably with the link quality of the non-anchor carrier, which is assumed to experience similar propagation conditions, as illustrated in FIG. 6. In the event that the anchor carrier is heavily loaded while the non-anchor carrier is lightly loaded, or vice versa, then the assumption could only provide an approximate link quality for the non-anchor carrier.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of a network node of a wireless network indicating a subset of one or more paging groups of UEs among a plurality of UEs in an NB-IoT cell. The method may also involve the processor transmitting one or more NRSs in one or more paging frames or one or more paging occasions associated with the subset of one or more paging groups.

In one aspect, a method may involve a processor of a UE receiving an indication from a wireless network that the UE belongs to a subset of one or more paging groups among a plurality of UEs in an NB-IoT cell. The method may also involve the processor receiving one or more NRSs in one or more paging frames or one or more paging occasions associated with the subset of one or more paging groups.

It is noteworthy that, although description provided herein may be in the context of certain radio access technologies, networks and network topologies such as IoT and NB-IoT, the proposed concepts, schemes and any variation(s)/derivative(s) thereof may be implemented in, for and by other types of radio access technologies, networks and network topologies such as, for example and without limitation, 5th Generation (5G), New Radio (NR), Long-Term Evolution (LTE), LTE-Advanced, LTE-Advanced Pro. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art.

In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to NRS transmission on non-anchor carriers in NB-IoT. According to the present disclosure, a number of possible solutions may be implemented separately or jointly. That is, although these possible solutions may be described below separately, two or more of these possible solutions may be implemented in one combination or another.

In the specifications, a UE may assume that NRSs on a non-anchor carrier are transmitted in a narrowband physical downlink control channel (NPDCCH) where the UE finds downlink control information (DCI) with cyclic redundancy check (CRC) scrambled by a paging radio network temporary identifier (P-RNTI). The UE ma also assume that NRSs are transmitted ten NB-IoT downlink (DL) subframes before and four NB-IoT DL subframes after the NPDCCH candidate. In an event that the DCI with CRC scrambled by the P-RNTI schedules a narrowband physical downlink shared channel (NPDSCH), the UE may assume that NRSs are transmitted in the NB-IoT DL subframes carrying the NPDSCH as well as the four NB-IOT DL subframes before and after the scheduled NPDSCH. In an event that there is no paging, a base station (e.g., eNB) does not need to transmit any NRS, whether in the NPDCCH candidate or in the ten NB-IoT DL subframes before and four NB-IoT DL subframes after the NPDCCH candidate. In an event that there is no paging for any of a plurality of UEs associated with the base station at a given time, then there would be no NPDCCH candidate and, consequently, there would be no NRS in either the closed subscriber group (CSG) subscriber server (CSS) Type 1 element or in the ten NB-IoT DL subframes before and four NB-IoT DL subframes after the CSS Type 1 element. Thus, a straightforward way of ensuring that there is always NRS whether there is paging or not may be to always transmit NRSs in CSS Type 1 element and in the ten NB-IoT DL subframes before and four NB-IoT DL subframes after the CSS Type 1 element.

Each paging group may include many UEs depending on their respective UE identifiers (UE_IDs). In case that NRSs are always transmitted whether or not there is paging for all paging groups, NRS overhead may be unnecessarily increased for the non-anchor carrier. On the other hand, keeping NRS overhead on the non-anchor carrier as low as possible could be achieved by only having NRS present as necessary to minimize inter-cell NRS interference. Accordingly, it may be sufficient to increase NRS overhead to a point to allow rough measurements to complement existing way(s) of linking anchor carrier measurements to non-anchor carrier.

Figure 1:
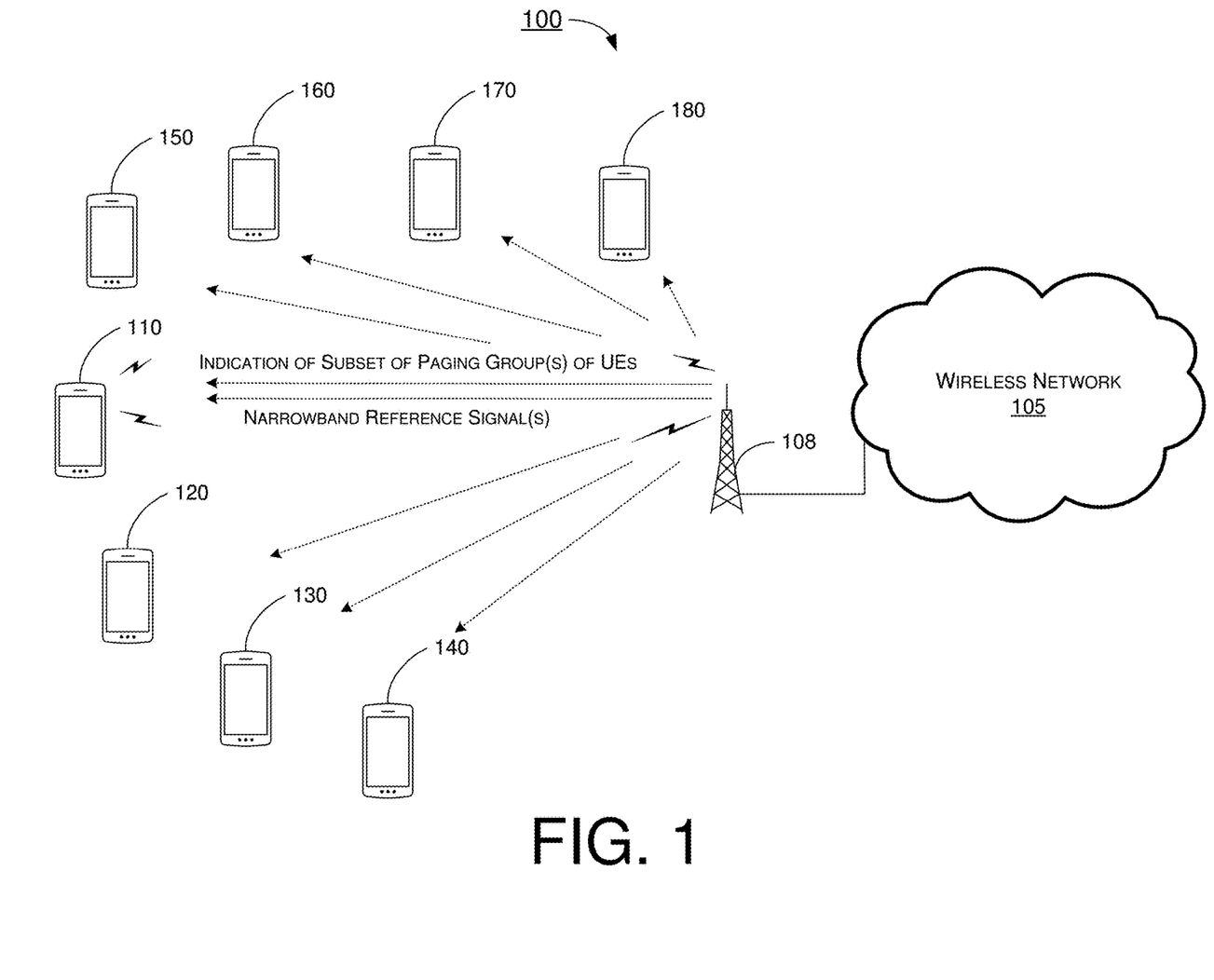
FIG. 1 is a diagram of an example network environment in which various solutions and schemes in accordance with the present disclosure may be implemented.
Figure 2:
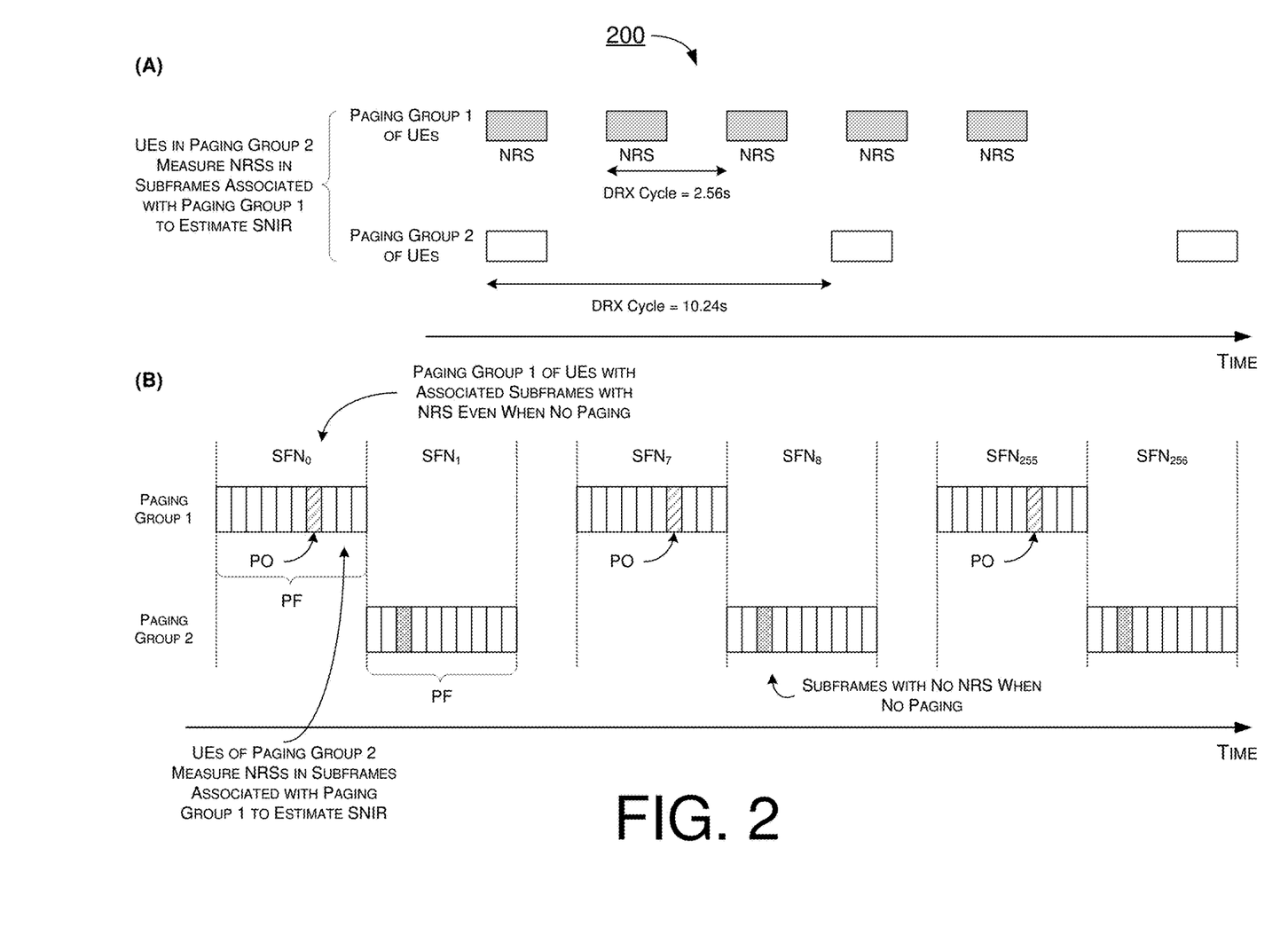
FIG. 2 is a diagram of an example scenario in accordance with the present disclosure.

FIG. 1 illustrates an example network environment 100 in which various solutions and schemes in accordance with the present disclosure may be implemented. FIG. 2 illustrates an example scenario 200 in accordance with the present disclosure. Scenario 200 may involve radio access network (RAN)-level UE grouping for paging. Scenario 200 may be implemented in network environment 100. The following description of various proposed schemes is provided with reference to FIG. 1 and FIG. 2.

Referring to FIG. 1, network environment 100 may involve a plurality of UEs 110~180 in wireless communication with a wireless network 105 (e.g., an NB-IoT network) via a base station 108 (e.g., an eNB, gNB or transmit-receive point (TRP)). In network environment 100, one or more of UEs 110~180 and wireless network 105 may implement various schemes pertaining to NRS transmission on non-anchor carriers in NB-IoT in accordance with the present disclosure. For instance, UE 110 may receive, and network 105 may transmit, an NRS in accordance with various schemes proposed herein.

Under a proposed scheme in accordance with the present disclosure, an NRS may be transmitted for a subset of paging groups among UEs 110~180 depending on paging configuration such as, for example and without limitation, discontinuous reception (DRX) cycle, paging frame (PF) and/or paging occasion (PO) thereof. That is, NRSs may not be transmitted except for PFs and/or POs associated with the subset of paging groups (e.g., a first paging group including UEs 110~140 and a second paging group including UEs 150~180). Accordingly, new signaling may be necessary to indicate to a given UE (e.g., UE 110) of the subset of paging groups.

Referring to part (A) of FIG. 2, a first paging group of UEs (denoted as "page group 1 of UEs" in FIG. 2) may have a DRX cycle of 2.56 seconds and a second group of UEs (denoted as "paging group 2 of UEs" in FIG. 2) may have a DRX cycle of 10.24 seconds. Referring to part (A) and part (B) of FIG. 2, UEs in the first paging group may receive an NRS on certain subframes every DRX cycle. Specifically, UEs in the first paging group may be associated with subframes with NRS even when there is no paging. On the other hand, UEs in the second paging group may be associated with subframes with no NRS when there is no paging. Under the proposed scheme, UEs in the second paging group may measure the NRS in those subframes associated with the first paging group with NRS even when there is no paging, thereby estimating signal-to-noise-plus-interference ratio (SNIR).

In network environment 100, each of UEs 110~180 may be identified by its respective UE_ID at RAN level. The UE_ID may be linked to the UE's international mobile subscriber identity (IMSI). For instance, a given UE_ID of a given UE may be expressed as: UE_ID=IMSI mod 4096. The PF may be linked to a system frame number (SFN) and UE_ID as Equation (1) below:

$$PF = SFN \bmod T = (T \text{ div } N)*(UE\_ID \bmod N) \qquad \text{Eqn. (1)}$$

The parameter T in Equation (1) denotes a DRX cycle, typically set to a value DefaultPagingCycle=128, 256, 512, 1024 radio frames (10 ms). The parameter N may be expressed mathematically as N=min (T, nB), with nB being 4T, 2T, T, T/2, T/4, T/8, T/16, T/32, T/64, T/128, T/256, T/512 or T/1024.

One paging frame (PF), as one radio frame, may contain one or more paging occasions (POs). When DRX is used, a UE may need to monitor one PO per DRX cycle and not more. The number of POs in a PF may be determined by Ns=max (1, nB/T). An index, i_s, which points to a PO from a subframe pattern may be defined as Equation (2) below:

$$i\_s = \text{floor}(UE\_ID/N) \bmod Ns \qquad \text{Eqn. (2)}$$

In an event that paging configuration for a non-anchor carrier is provided in system information, the paging carrier may be determined as the smallest index n ($0 \leq n \leq Nn-1$) fulfilling Equation (3) below:

$$\text{floor}(UE\_ID/(N*Ns)) \bmod W < W(0) + W(1) + \ldots + W(n) \qquad \text{Eqn. (3)}$$

In Equation (3), the parameter Nn denotes the number of paging narrow bands (for P-RNTI monitored on machine-type communication (MTC) physical downlink control channel (MPDCCH)) provided in system information. The parameter W(i) denotes the weight for NB-IoT paging carrier i. The parameter W denotes the total weight of all NB-IoT paging carriers in that W=W(0)+ W(1)+ . . . +W(Nn−1).

Under the proposed scheme, NRS may not be transmitted unless it is for a subset of POs for SNIR estimation so as to keep NRS overhead on non-anchor carriers as low as possible. The SNIR estimated over NRSs in the subset of POs may be re-used for early detection of NPDCCH and/or wake-up signal (WUS) for the entire set of POs. Additionally, the subset of POs, which have associated subframes containing NRS even when no paging NPDCCH is transmitted, may be determined by a UE (e.g., UE 110) based at least in part on common DRX cycle configuration for paging indicated by common signaling in system information block (SIB). Moreover, a UE belonging to a given paging group (e.g., one of one or more paging groups of UEs that monitor paging in the same PO) may use NRS(s) belonging to a PO of a different group in addition to the NRS(s) for its own group.

Under the proposed scheme, the minimum number of paging groups of UEs in a DRX cycle may be 1, corresponding to one paging carrier, one PF in a paging cycle and one PO in a PF. The maximum possible number of UE groups for paging may be N*Ns*Nn, corresponding to Nn paging carriers, N PFs in a paging cycle and Ns POs in a PF. For instance, on a given non-anchor carrier, there may be at most 32 UE groups for paging. An illustrative example of UE grouping for paging is provided below.

In one illustrative example, there may be 720,000 UEs in cells associated with a given tracking area code (TAC) or 36,000 UEs per eNB cell, assuming there are 20 eNBs per TAC. The mobility management entity (MME) may send a tracking area list (TAL) to each UE listing TAC1 and TAC3. In this example, DRX cycle T=256, paging parameter nB=T/8=32, thus N=min (T, nB)=32. There are 1024/T PFs for each value of rightmost term, D, linked to (UE_ID mod N) in PF formula, such as D=(T div N)*(UE_ID mod N), thus:

$$D = (T\,div\,N) * (UE\_ID\,mod\,N) =$$
$$(256\,div\,32) * (UE\_ID\,mod\,32) = 8 * (UE\_ID\,mod\,32)$$

Here, UE_ID=IMSI mod 4096, and D=0, 8, 16, . . . 248.

This gives N=32 UE groups for paging. Each UE group has a configured PF. The N=32 PFs corresponding to SFN mod 256=D, denoted by {PF0, PF1, PF2, PF3, PF31} as follows:

UE_IDmod32 = 0, D = 0, PF0 = [0, 256, 512, 768]

UE_IDmod32 = 1, D = 8, PF1 = [8, 264, 520, 776]

UE_IDmod32 = 2, D = 16, PF2 = [16, 272, 528, 784]

...

UE_IDmod32 = 31, D = 248, PF31 = [248, 504, 760, 1016]

In this example, there are four PFs per DRX cycle per UE group for paging. Each UE group is linked to UE_ID=IMSI mod 4096=0, 1, 2, . . . 31. There are 2.44×10$^6$ (=10$^{10}$/4096) UEs sharing the same UE_ID based on 10-digit IMSI per UE group, or 7.63×10$^4$ UEs per paging group. Thus, there are up to four POs per PF (based on the Ns parameter) and 16 paging records per PO. There are 8192 UEs that can be paged in 2.56 seconds (256*10 ms), or 2400 paging messages per second (8192/2.56). This allows 720,000 UEs in a TAC to be paged at least once every five minutes (720,000/2,400=300).

Assuming paging is scheduled over about 20 eNB cells in the TAC, and paged UEs are uniformly distributed across the 20 eNB cells, about 120 UEs would need to access the respective cell(s) via random access procedure on receiving the paging. There seems to be no paging bottleneck with the considered paging configuration. There may be bottleneck for data assuming a maximum of about 64 UEs with one data transport block (TB) per second can be supported including paging procedure overhead (Msg3, Msg4 in random access) and one or two repetitions.

Under the proposed scheme, NRS may not be transmitted other than in CSS Type 1 element and in the ten NB-IoT DL subframes before and the four NB-IoT DL subframes after the CSS Type 1 element for a subset of paging groups as indicated by an N-bit bitmap nrsTransmitBitmap, which may be broadcasted on system information block SIB2 in SystemInformationBlockType2-NB in RadioResourceConfigCommonSIB-NB.

It may be up to the network to configure the proposed bitmap to ensure there is sufficient number of NRSs transmitted on a non-anchor carrier even if there is no paging. In some cases, the N-bit bitmap nrsTransmitBitmap may be indicated via dedicated radio resource control (RRC) signaling for UEs in a given cell.

Under the proposed scheme, the N-bit bitmap nrsTransmitBitmap may be expressed as follows:

nrsTransmitBitmap=BIT STRING(SIZE($N$))= {$b0,b1, \ldots bN$}

Here, N=min (T, nB) and bi=UE_ID mod N=i, with i=0, 1, . . . N−1. The N-bit bitmap nrsTransmitBitmap may be received by UEs camping on a non-anchor carrier or several non-anchor carriers. The same nrsTransmitBitmap or different instances/values of nrsTransmitBitmap may be signaled to the UEs on one or more non-anchor carriers.

On reading the N-bitmap in SIB2, a UE (e.g., UE 110) may determine the paging group and associated PF where NRS may be assumed to be always transmitted. For instance, a subset of paging groups with NRS always transmitted may be indicated by an N-bit bitmap, nrsTransmitBitmap, broadcasted on system information block SIB2. The size of the N-bit bitmap may be 32 bits for N=32 UE groups for paging. In this example, when the bits of N-bit bitmap B={1 0 0 0 . . . 0}, there is NRS always transmitted in PF=[0, 256, 512, 768] in NPDCCH candidates in CSS Type 1 element, and ten subframes before and four subframes after NPDCCH candidates. Moreover, when the bits of N-bit bitmap B={1 0 1 0 . . . 0}, there is NRS always transmitted in PF0=[0, 256, 512, 768] and PF2=[16, 272, 528, 784] in NPDCCH candidates in CSS Type 1 element, and ten subframes before and four subframes after NPDCCH candidates.

Illustrative Implementations

Figure 3:
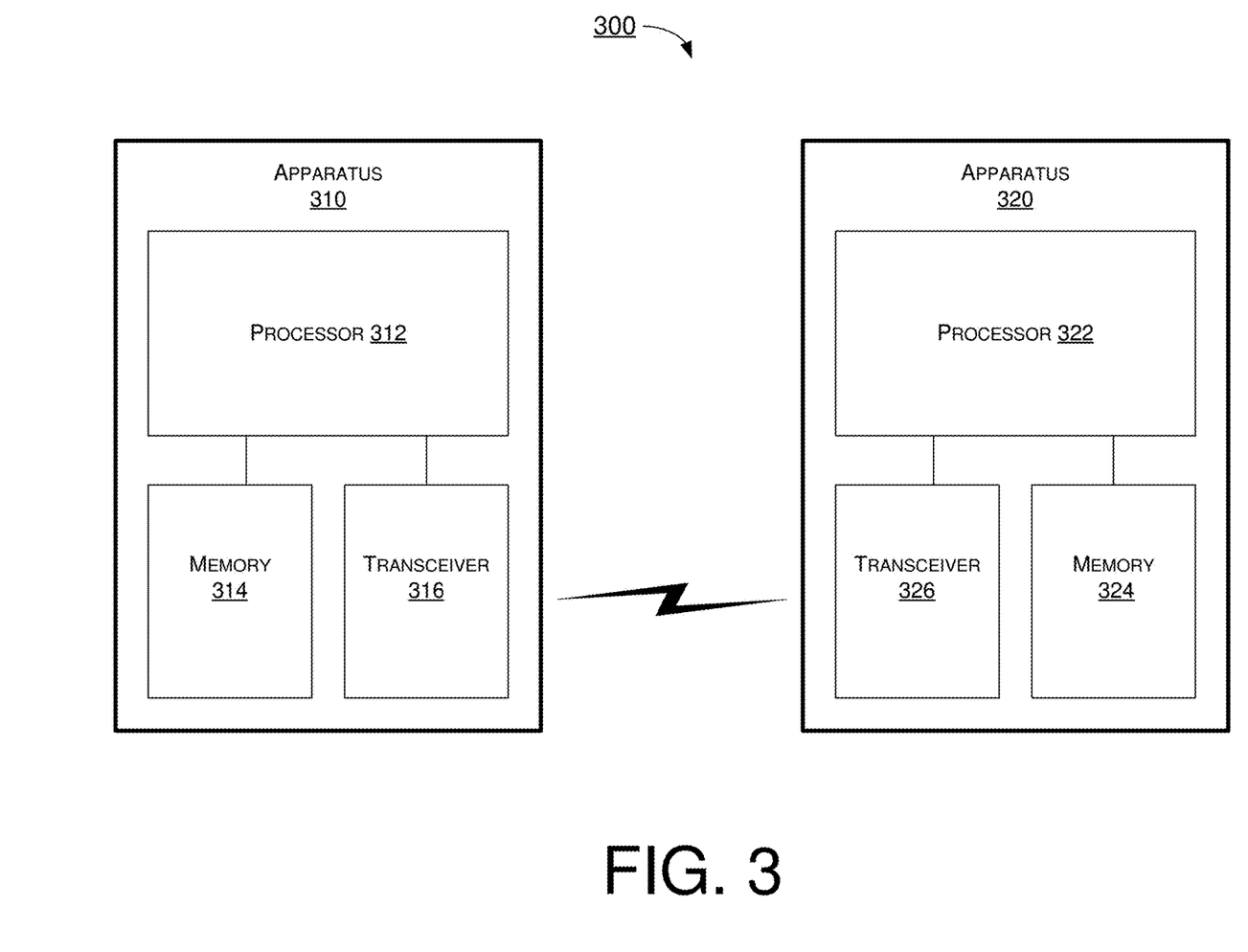
FIG. 3 is a block diagram of an example communication apparatus and an example network apparatus in accordance with an implementation of the present disclosure.
Figure 4:
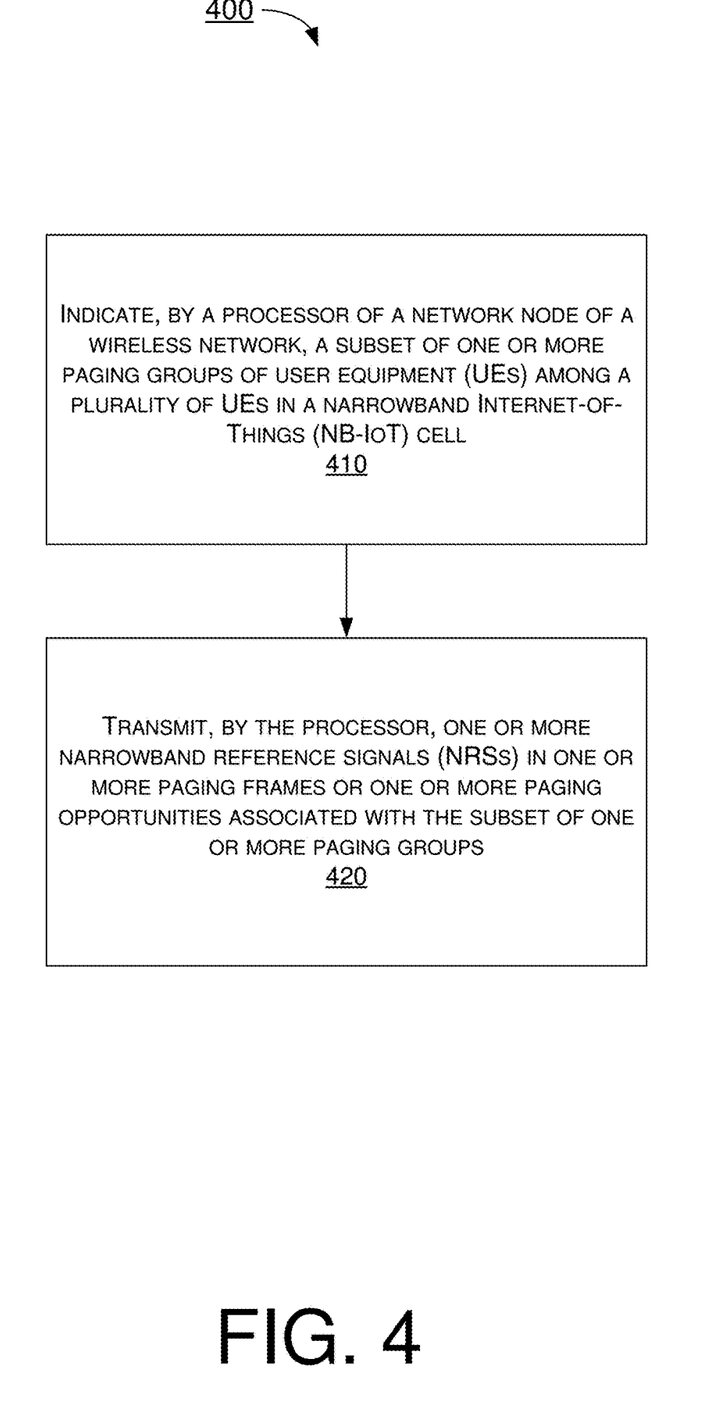
FIG. 4 is a flowchart of an example process in accordance with an implementation of the present disclosure.
Figure 5:
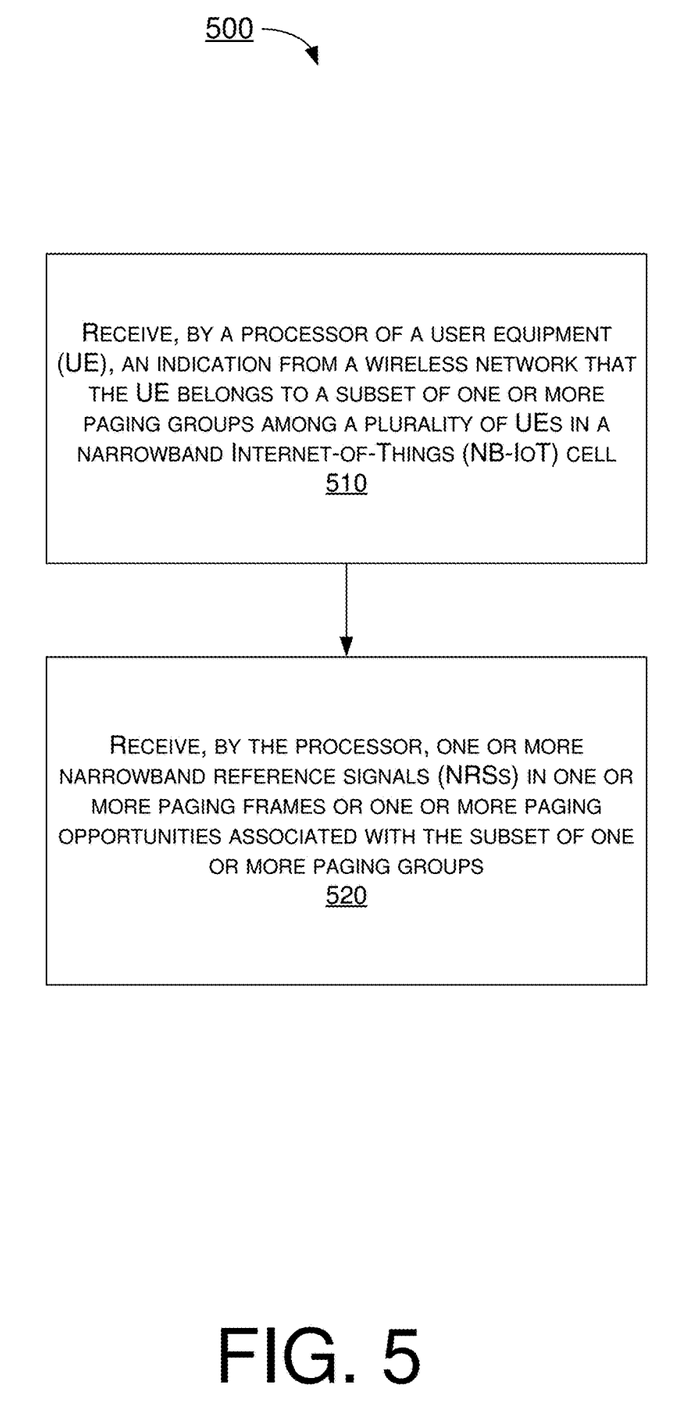
FIG. 5 is a flowchart of an example process in accordance with an implementation of the present disclosure.

FIG. 3 illustrates an example communication environment 300 having an example apparatus 310 and an example apparatus 320 in accordance with an implementation of the present disclosure. Each of apparatus 310 and apparatus 320 may perform various functions to implement schemes, techniques, processes and methods described herein pertaining to NRS transmission on non-anchor carriers in NB-IoT, including various schemes described above as well as processes 400 and 500 described below.

Each of apparatus 310 and apparatus 320 may be a part of an electronic apparatus, which may be a UE such as a portable or mobile apparatus, a wearable apparatus, a wireless communication apparatus or a computing apparatus. For instance, each of apparatus 310 and apparatus 320 may be implemented in a smartphone, a smartwatch, a personal digital assistant, a digital camera, or a computing equipment such as a tablet computer, a laptop computer or a notebook computer. Each of apparatus 310 and apparatus 320 may also be a part of a machine type apparatus, which may be an IoT or NB-IoT apparatus such as an immobile or a stationary apparatus, a home apparatus, a wire communication apparatus or a computing apparatus. For instance, each of apparatus 310 and apparatus 320 may be implemented in a smart thermostat, a smart fridge, a smart door lock, a wireless speaker or a home control center. Alternatively, each of apparatus 310 and apparatus 320 may be implemented in the form of one or more integrated-circuit (IC) chips such as, for example and without limitation, one or more single-core processors, one or more multi-core processors, or one or more complex-instruction-set-computing (CISC) processors. Each of apparatus 310 and apparatus 320 may include at least some of those components shown in FIG. 3 such as a processor 312 and a processor 322, respectively. Each of apparatus 310 and apparatus 320 may further include one or more other components not pertinent to the proposed scheme of the present disclosure (e.g., internal power supply, display device and/or user interface device), and, thus, such component(s) of each of apparatus 310 and apparatus 320 are neither shown in FIG. 3 nor described below in the interest of simplicity and brevity.

In some implementations, at least one of apparatus 310 and apparatus 320 may be a part of an electronic apparatus, which may be a network node or base station (e.g., eNB, gNB or transmit/receive point (TRP)), a small cell, a router or a gateway. For instance, at least one of apparatus 310 and apparatus 320 may be implemented in an eNodeB in an LTE, LTE-Advanced or LTE-Advanced Pro network or in a gNB in a 5G, NR, IoT or NB-IoT network. Alternatively, at least one of apparatus 310 and apparatus 320 may be implemented in the form of one or more IC chips such as, for example and without limitation, one or more single-core processors, one or more multi-core processors, or one or more CISC processors.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including NRS transmission on non-anchor carriers in NB-IoT in accordance with various implementations of the present disclosure.

In some implementations, apparatus 310 may also include a transceiver 316 coupled to processor 312 and capable of wirelessly transmitting and receiving data. In some implementations, apparatus 310 may further include a memory 314 coupled to processor 312 and capable of being accessed by processor 312 and storing data therein. In some implementations, apparatus 320 may also include a transceiver 326 coupled to processor 322 and capable of wirelessly transmitting and receiving data. In some implementations, apparatus 320 may further include a memory 324 coupled to processor 322 and capable of being accessed by processor 322 and storing data therein. Accordingly, apparatus 310 and apparatus 320 may wirelessly communicate with each other via transceiver 316 and transceiver 326, respectively.

To aid better understanding, the following description of the operations, functionalities and capabilities of each of apparatus 310 and apparatus 320 is provided in the context of a NB-IoT communication environment in which apparatus 310 is implemented in or as a wireless communication device, a communication apparatus or a UE and apparatus 320 is implemented in or as a network node (e.g., base station 108) connected or otherwise communicatively coupled to a wireless network (e.g., wireless network 105).

In one aspect of NRS transmission on non-anchor carriers in NB-IoT in accordance with the present disclosure, processor 322 of apparatus 320 as a network node may indicate, via transceiver 326, a subset of one or more paging groups of UEs among a plurality of UEs (e.g., UE 110~180, including apparatus 310 as one of the UEs) in an NB-IoT cell. Additionally, processor 322 may transmit, via transceiver 326, one or more narrowband reference signals (NRSs) in one or more paging frames or one or more paging occasions associated with the subset of one or more paging groups.

In some implementations, in indicating the subset of one or more paging groups, processor 322 may broadcast an N-bit bitmap that indicates the subset of one or more paging groups via a SIB, with N being a positive integer greater than 1.

In some implementations, in broadcasting the N-bit bitmap via the SIB, processor 322 may broadcast the N-bit bitmap on a system information block SIB2 in SystemInformationBlockType2-N B in RadioResourceConigCommonSIB-NB.

In some implementations, in broadcasting the N-bit bitmap, processor 322 may determine the N-bit bitmap for the one or more paging groups based at least in part on a DRX cycle and a parameter that is proportional or inversely proportional to the DRX cycle.

In some implementations, in indicating the subset of one or more paging groups, processor 322 may broadcast an N-bit bitmap that indicates the subset of one or more paging groups via dedicated RRC signaling for the plurality of UEs in the NB-IoT cell, with N being a positive integer greater than 1.

In some implementations, in indicating the subset of one or more paging groups, processor 322 may broadcast an N-bit bitmap, with N being a positive integer greater than 1. In some implementations, each bit of the N-bit bitmap may have a value of 1.

In some implementations, in indicating the subset of one or more paging groups, processor 322 may signal a same N-bit bitmap or different N-bit bitmaps on one or more non-anchor carriers, with N being a positive integer greater than 1.

In some implementations, in transmitting the one or more NRSs, processor 322 may transmit at least one of the one or more NRSs when there is no paging transmitted to any UE in the subset of one or more paging groups.

In some implementations, in transmitting the one or more NRSs, processor 322 may transmit the one or more NRSs in a CSS Type 1 element and also in ten NB-IoT DL subframes before and four NB-IOT DL subframes after the CSS Type 1 element for the indicated subset of one or more paging groups.

In some implementations, in transmitting the one or more NRSs, processor 322 may transmit the one or more NRSs to one or more UEs of the plurality of UEs that are camped on one or more non-anchor carriers.

In another aspect of NRS transmission on non-anchor carriers in NB-IoT in accordance with the present disclosure, processor 312 of apparatus 310 as a UE may receive, via transceiver 316, an indication from a wireless network (e.g., via apparatus 320 as a base station) that apparatus 310 belongs to a subset of one or more paging groups among a plurality of UEs in an NB-IoT cell. Moreover, processor 312 may receive, via transceiver 316, one or more NRSs in one or more paging frames or one or more paging occasions associated with the subset of one or more paging groups.

In some implementations, in receiving the indication, processor 312 may receive a broadcast of an N-bit bitmap indicating that apparatus 310 belongs to the subset of one or more paging groups via a SIB, with N being a positive integer greater than 1.

In some implementations, in receiving the broadcast of the N-bit bitmap via the SIB, processor 312 may receive a broadcast of the N-bit bitmap on a system information block SIB2 in SystemInformatinoBlockType2-NB in RadioResourceConigCommonSIB-NB.

In some implementations, the N-bit bitmap may be determined based at least in part on a DRX cycle and a parameter that is proportional or inversely proportional to the DRX cycle.

In some implementations, in receiving the indication, processor 312 may receive a broadcast of an N-bit bitmap indicating that apparatus 310 belongs to the subset of one or more paging groups via dedicated RRC signaling for the plurality of UEs in the NB-IoT cell, with N being a positive integer greater than 1.

In some implementations, in receiving the indication processor 312 may receive a broadcast of an N-bit bitmap, with N being a positive integer greater than 1. In some implementations, each bit of the N-bit bitmap may have a value of 1.

In some implementations, in receiving the indication, processor 312 may receive signaling of a same N-bit bitmap or different N-bit bitmaps on one or more non-anchor carriers, with N being a positive integer greater than 1.

In some implementations, at least one other NRS may be transmitted by the wireless network when there is no paging transmitted to any UE in the subset of one or more paging groups.

In some implementations, in receiving the one or more NRSs, processor 312 may receive the one or more NRSs in a CSS Type 1 element and also in ten NB-IoT DL subframes before and four NB-IOT DL subframes after the CSS Type 1 element for the subset of one or more paging groups.

In some implementations, in response to receiving at least one of the one or more NRSs, 312 may perform certain operations. For instance, processor 312 may determine a paging group of the subset of one or more paging groups to which apparatus 310 belongs. Moreover, processor 312 may determine one or more associated paging frames where a plurality of NRS including the one or more NRSs are assumed to be transmitted by the wireless network.

Illustrative Processes

FIG. 4 illustrates an example process 400 in accordance with an implementation of the present disclosure. Process 400 may be an example implementation of the proposed schemes described above with respect to NRS transmission on non-anchor carriers in NB-IoT in accordance with the present disclosure. Process 400 may represent an aspect of implementation of features of apparatus 310 and apparatus 320. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may also be repeated partially or entirely. Process 400 may be implemented by apparatus 310, apparatus 320 and/or any suitable wireless communication device, UE, base station or machine type devices. Solely for illustrative purposes and without limitation, process 400 is described below in the context of apparatus 310 as a UE and apparatus 320 as a network node (e.g., base station 108) of a wireless network (e.g., wireless network 105). Process 400 may begin at block 410.

At 410, process 400 may involve processor 322 of apparatus 320 as a network node indicating, via transceiver 326, a subset of one or more paging groups of UEs among a plurality of UEs (e.g., UE 110~180, including apparatus 410 as one of the UEs) in an NB-IoT cell. Process 400 may proceed from 410 to 420.

At 420, process 400 may involve processor 322 transmitting, via transceiver 326, one or more narrowband reference signals (NRSs) in one or more paging frames or one or more paging occasions associated with the subset of one or more paging groups.

In some implementations, in indicating the subset of one or more paging groups, process 400 may involve processor 322 broadcasting an N-bit bitmap that indicates the subset of one or more paging groups via a SIB, with N being a positive integer greater than 1.

In some implementations, in broadcasting the N-bit bitmap via the SIB, process 400 may involve processor 322 broadcasting the N-bit bitmap on a system information block SIB2 in SystemInformatinoBlockType2-NB in RadioResourceConigCommonSIB-NB.

In some implementations, in broadcasting the N-bit bitmap, process 400 may involve processor 322 determining the N-bit bitmap for the one or more paging groups based at least in part on a DRX cycle and a parameter that is proportional or inversely proportional to the DRX cycle.

In some implementations, in indicating the subset of one or more paging groups, process 400 may involve processor 322 broadcasting an N-bit bitmap that indicates the subset of one or more paging groups via dedicated RRC signaling for the plurality of UEs in the NB-IoT cell, with N being a positive integer greater than 1.

In some implementations, in indicating the subset of one or more paging groups, process 400 may involve processor 322 broadcasting an N-bit bitmap, with N being a positive integer greater than 1. In some implementations, each bit of the N-bit bitmap may have a value of 1.

In some implementations, in indicating the subset of one or more paging groups, process 400 may involve processor 322 signaling a same N-bit bitmap or different N-bit bitmaps on one or more non-anchor carriers, with N being a positive integer greater than 1.

In some implementations, in transmitting the one or more NRSs, process 400 may involve processor 322 transmitting at least one of the one or more NRSs when there is no paging transmitted to any UE in the subset of one or more paging groups.

In some implementations, in transmitting the one or more NRSs, process 400 may involve processor 322 transmitting the one or more NRSs in a CSS Type 1 element and also in ten NB-IoT DL subframes before and four NB-IOT DL subframes after the CSS Type 1 element for the indicated subset of one or more paging groups.

In some implementations, in transmitting the one or more NRSs, process 400 may involve processor 322 transmitting the one or more NRSs to one or more UEs of the plurality of UEs that are camped on one or more non-anchor carriers.

FIG. 5 illustrates an example process 500 in accordance with an implementation of the present disclosure. Process 500 may be an example implementation of the proposed schemes described above with respect to NRS transmission on non-anchor carriers in NB-IoT in accordance with the present disclosure. Process 500 may represent an aspect of implementation of features of apparatus 310 and apparatus 320. Process 500 may include one or more operations, actions, or functions as illustrated by one or more of blocks 510 and 520. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may also be repeated partially or entirely. Process 500 may be implemented by apparatus 310, apparatus 320 and/or any suitable wireless communication device, UE, base station or machine type devices. Solely for illustrative purposes and without limitation, process 500 is described below in the context of apparatus 310 as a UE and apparatus 320 as a network node (e.g., base station 108) of a wireless network (e.g., wireless network 105). Process 500 may begin at block 510.

At 510, process 500 may involve processor 312 of apparatus 310 as a UE receiving, via transceiver 316, an indication from a wireless network (e.g., via apparatus 320 as a base station) that apparatus 310 belongs to a subset of one or more paging groups among a plurality of UEs in an NB-IoT cell. Process 500 may proceed from 510 to 520.

At 520, process 500 may involve processor 312 receiving, via transceiver 316, one or more narrowband reference signals (NRSs) in one or more paging frames or one or more paging occasions associated with the subset of one or more paging groups.

In some implementations, in receiving the indication, process 500 may involve processor 312 receiving a broadcast of an N-bit bitmap indicating that apparatus 310 belongs to the subset of one or more paging groups via a SIB, with N being a positive integer greater than 1.

In some implementations, in receiving the broadcast of the N-bit bitmap via the SIB, process 500 may involve processor 312 receiving a broadcast of the N-bit bitmap on a system information block SIB2 in SystemInformatinoBlockType2-NB in RadioResourceConigCommonSIB-NB.

In some implementations, the N-bit bitmap may be determined based at least in part on a DRX cycle and a parameter that is proportional or inversely proportional to the DRX cycle.

In some implementations, in receiving the indication, process 500 may involve processor 312 receiving a broadcast of an N-bit bitmap indicating that apparatus 310 belongs to the subset of one or more paging groups via dedicated RRC signaling for the plurality of UEs in the NB-IoT cell, with N being a positive integer greater than 1.

In some implementations, in receiving the indication, process 500 may involve processor 312 receiving a broadcast of an N-bit bitmap, with N being a positive integer greater than 1. In some implementations, each bit of the N-bit bitmap may have a value of 1.

In some implementations, in receiving the indication, process 500 may involve processor 312 receiving signaling of a same N-bit bitmap or different N-bit bitmaps on one or more non-anchor carriers, with N being a positive integer greater than 1.

In some implementations, at least one other NRS may be transmitted by the wireless network when there is no paging transmitted to any UE in the subset of one or more paging groups.

In some implementations, in receiving the one or more NRSs, process 500 may involve processor 312 receiving the one or more NRSs in a CSS Type 1 element and also in ten NB-IoT DL subframes before and four NB-IOT DL subframes after the CSS Type 1 element for the subset of one or more paging groups.

In some implementations, in response to receiving at least one of the one or more NRSs, process 500 may involve processor 312 performing certain operations. For instance, process 500 may involve processor 312 determining a paging group of the subset of one or more paging groups to which apparatus 310 belongs. Moreover, process 500 may involve processor 312 determining one or more associated paging frames where a plurality of NRS including the one or more NRSs are assumed to be transmitted by the wireless network.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    transmitting, by a processor of a network node of a wireless network, one or more narrowband reference signals (NRSs) in one or more paging frames or one or more paging occasions associated with a subset of one or more paging groups depending on a paging configuration,
    wherein the paging configuration comprises one or more of discontinuous reception (DRX) cycle, paging frame (PF), and paging occasion (PO), and
    wherein the transmitting of the one or more NRSs comprises:
        transmitting the one or more NRSs in a Common Search Space (CSS) Type 1 element and also in ten NB-IoT downlink (DL) subframes before and four NB-IOT DL subframes after the CSS Type 1 element for the indicated subset of one or more paging groups; or
        transmitting at least one of the one or more NRSs when there is no paging transmitted to any user equipment (UE) in the subset of one or more paging groups; or
        transmitting the one or more NRSs to one or more UEs of the plurality of UEs that are camped on one or more non-anchor carriers.

2. The method of claim 1, wherein the PF is linked to a system frame number (SFN) and a user equipment identifier (UE ID) as PF=SFN mod T=(T div N)*(UE ID mod N), wherein N is expressed mathematically as N=min (T, nB), wherein nB is 4T, 2T, T, T/2, T/4, T/8, T/16, T/32, T/64, T/128, T/256, T/512 or T/1024, and wherein T denotes a DRX cycle.

3. A method, comprising:
    receiving, by a processor of a user equipment (UE), an indication from a wireless network that the UE belongs to a subset of one or more paging groups among a plurality of UEs in a narrowband Internet-of-Things (NB-IoT) cell; and
    receiving, by the processor, one or more narrowband reference signals (NRSs) in one or more paging frames or one or more paging occasions associated with the subset of one or more paging groups,
    wherein the receiving of the one or more NRSs comprises receiving the one or more NRSs in a closed subscriber group (CSG) subscriber server (CSS) Type 1 element and also in ten NB-IoT downlink (DL) subframes before and four NB-IOT DL subframes after the CSS Type 1 element for the subset of one or more paging groups.

4. The method of claim 3, wherein the receiving of the indication comprises receiving a broadcast of an N-bit bitmap indicating that the UE belongs to the subset of one or more paging groups via a system information block (SIB), and wherein N is a positive integer greater than 1.

5. The method of claim 4, wherein the receiving of the broadcast of the N-bit bitmap via the SIB comprises receiving a broadcast of the N-bit bitmap on a system information block SIB2 in SystemInformationBlockType2-NB in RadioResourceConfigCommonSIB-NB.

6. The method of claim 4, wherein the N-bit bitmap is determined based at least in part on a discontinuous reception (DRX) cycle and a parameter that is proportional or inversely proportional to the DRX cycle.

7. The method of claim 3, wherein the receiving of the indication comprises receiving a broadcast of an N-bit bitmap indicating that the UE belongs to the subset of one or more paging groups via dedicated radio resource control (RRC) signaling for the plurality of UEs in the NB-IoT cell, and wherein N is a positive integer greater than 1.

8. The method of claim 3, wherein the receiving of the indication comprises receiving a broadcast of an N-bit bitmap, wherein N is a positive integer greater than 1, and wherein each bit of the N-bit bitmap has a value of 1.

9. The method of claim 3, wherein receiving of the indication comprises receiving signaling of a same N-bit bitmap or different N-bit bitmaps on one or more non-anchor carriers, and wherein N is a positive integer greater than 1.

10. The method of claim 3, wherein at least one other NRS is transmitted by the wireless network when there is no paging transmitted to any UE in the subset of one or more paging groups.

11. The method of claim 3, further comprising:
- determining, by the processor, a paging group of the subset of one or more paging groups to which the UE belongs; and
- determining, by the processor, one or more associated paging frames where a plurality of NRS including the one or more NRSs are assumed to be transmitted by the wireless network.

* * * * *